United States Patent [19]

Hollis, Jr. et al.

[11] Patent Number: 4,666,522
[45] Date of Patent: May 19, 1987

[54] STABLE LIGNOSULFONATE EMULSION

[75] Inventors: John W. Hollis, Jr., Schofield; Linda M. Layman, Rothschild, both of Wis.

[73] Assignee: Reed Lignin Inc., Rothschild, Wis.

[21] Appl. No.: 701,121

[22] Filed: Feb. 13, 1985

[51] Int. Cl.[4] .............................................. C08L 97/02
[52] U.S. Cl. ................................... 106/123.1; 106/277
[58] Field of Search .............................. 106/277, 123.1

[56] References Cited

U.S. PATENT DOCUMENTS

| | | | |
|---|---|---|---|
| Re. 15,944 | 11/1924 | Kirschbraun | 106/123.1 |
| 1,114,119 | 10/1914 | Coughlin et al. | 106/123.1 |
| 1,185,604 | 5/1916 | Puring | 106/123.1 |
| 1,840,157 | 1/1932 | Cross | 106/123.1 |
| 3,006,860 | 10/1961 | Heinz | 106/277 |
| 3,520,709 | 7/1970 | Mogg et al. | 106/123.1 |

Primary Examiner—Theodore Morris
Attorney, Agent, or Firm—Andrus, Sceales, Starke & Sawall

[57] ABSTRACT

A stable lignosulfonate emulsion for use as a binding agent includes an aqueous dispersion of lignosulfonate containing material having an initial solids concentration of between about 45% to about 65% by weight, and about 1 part to about 50 parts, per 100 parts of the lignosulfonate containing material, of a hydrophobe such as wax, oil, fat, asphalt or mixtures thereof. Spray drying the emulsion provides a powder which is less dusty than comparable lignosulfonate products similarly dried, and which upon rewetting provides a stable emulsion. A method of preparing the emulsion is also disclosed.

32 Claims, 1 Drawing Figure

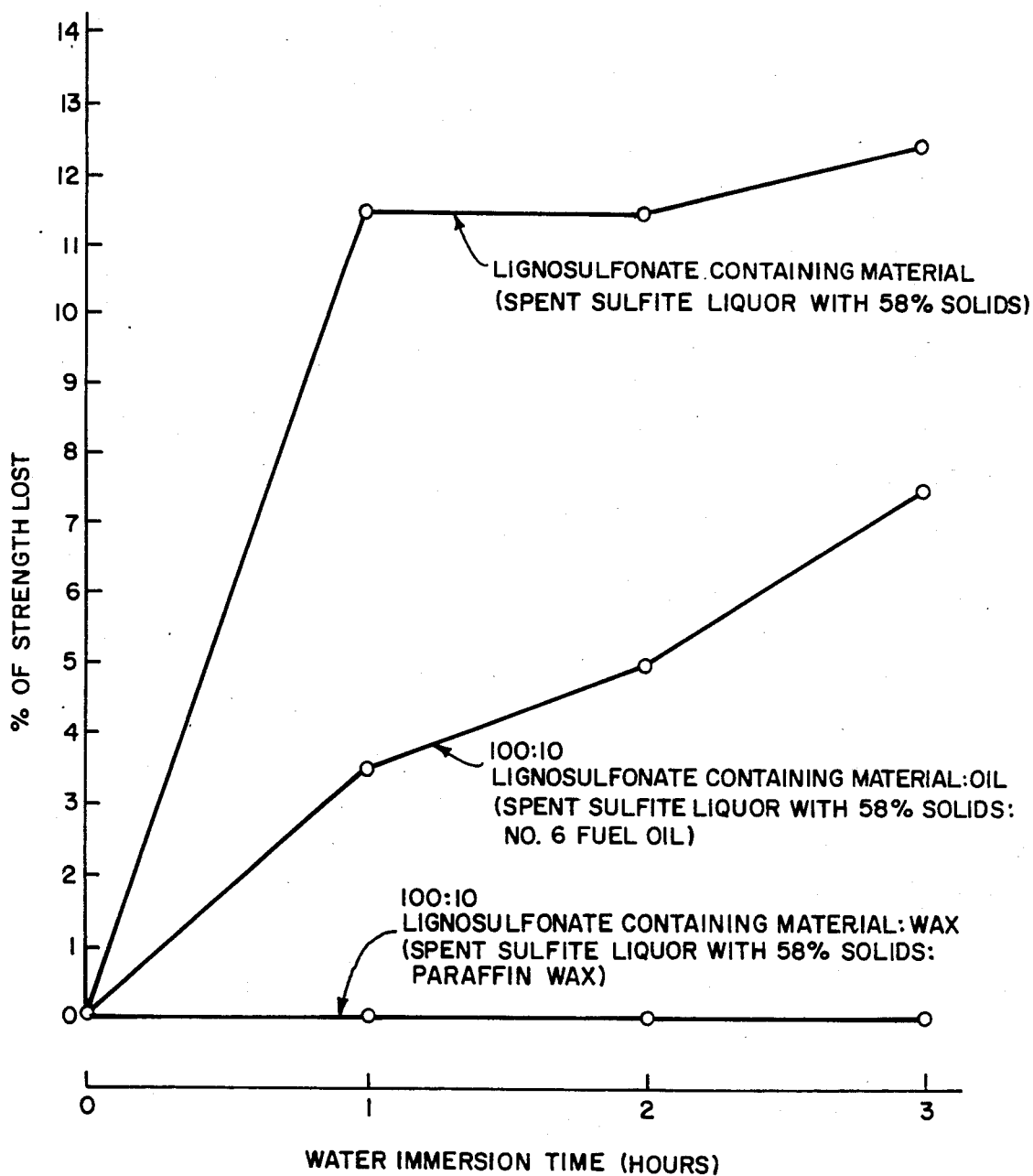

STABLE LIGNOSULFONATE EMULSION

BACKGROUND OF THE INVENTION

The present invention relates to a lignosulfonate based binding agent, and more particularly to a lignosulfonate based binder made by emulsification of a hydrophobe and a concentrated lignosulfonate containing material.

Lignosulfonates are known to be binding agents which facilitate briquetting and pelleting of materials. Lignosulfonates, however, are water soluble and unless reacted at greater than 200° C. to modify or remove various undersired non-lignin constituents such as carbohydrates, and/or crosslinked with expensive coupling agents such as phenol formaldehyde resin, provide dried bound briquettes and pellets subject to rapid degradation by water. While various water insoluble synthetic type binders may be utilized in briquetting or pelleting materials, they cannot be economically used to bind low value commodities such as coal, road surfaces, animal feeds and the like. Therefore, it is desirable to provide a low cost binder which facilitates briquetting and pelleting of materials and provides a bound form that is less susceptible to water degradation.

Certain lignosulfonates are also known to be emulsion stabilizers when utilized in relatively low concentrations such as 1% to 5% in waxes, oils and asphalt. Such emulsions, however, break when dried and upon rewetting do not provide stable emulsions.

SUMMARY OF THE INVENTION

A stable lignosulfonate emulsion for use as a binding agent includes an aqueous dispersion of lignosulfonate containing material and having an initial solids concentration of between about 45% to about 65% by weight, and about 1 part to about 50 parts, per 100 parts of the lignosulfonate containing material, of a hydrophobe. The hydrophobe may be a wax, an oil, a fat, asphalt or mixtures thereof.

Emulsification is carried out at a temperature at which the hydrophobe is a liquid. Therefore, if the hydrophobe is a liquid at room temperature no heating is necessary. If, however, the hydrophobe is a solid at room temperature, both the hydrophobe and the lignosulfonate containing material must be heated to or beyond the melting temperature of the hydrophobe to insure uniform mixing and prevent coagulation of the hydrophobe upon mixing. At this temperature, the hydrophobe is added to the concentrated lignosulfonate containing material at one part to 50 parts of hydrophobe per 100 parts of the lignosulfonate containing material. The starting or initial solids concentration of the lignosulfonate containing material is between about 45% to about 65% by weight, and is preferably 50% to 65% by weight. After the hydrophobe is mixed with the concentrated lignosulfonate containing material, the mixture is vigorously agitated or sheared to yield a stable emulsion. Finally, if desired, the emulsion may be dried by spraying or other means to a powder form.

The invention provides a lubricating binder which facilitates briquetting and pelleting of various materials and provides a bound form, which when dry, is less susceptible to degradation by water solubilization. The invention also provides a low cost binder based upon waste pulping liquor from sulfite pulping processes which can be economically used to bind low value commodities such as coal, road surfaces, animal feeds and the like. The invention further provides a product which, upon drying, is a much less dusty powder than comparable lignosulfonate products similarly dried. The powder is free flowing and is less wettable than that which would be obtained by drying concentrated spent sulfite liquor alone. Powders of the present lignosulfonate emulsion are thus easier to handle and much more storage stable. Unique to this product is it characteristic of rewetting to give a stable emulsion.

BRIEF DESCRIPTION OF THE DRAWING

FIG. 1 is a graph which illustrates the percentage of strength loss versus time of complete water immersion of coal bound with spent sulfite liquor versus a spray dried emulsion of No. 6 oil and spent sulfite liquor, and an emulsion of paraffin wax and spent sulfite liquor.

DESCRIPTION OF THE PREFERRED EMBODIMENT

A hydrophobe is mixed with a concentrated lignosulfonate containing material to provide an emulsion. The resulting emulsion is a low cost binder which will, in addition to binding per se, provide lubrication in binding operations and a bound form such as briquettes or pellets which, when dried, is more resistant to degradation of both form and strength in the presence of water. When spray dried, the emulsion provides a free flowing lignosulfonate based powder which is less dusty than lignosulfonates alone. The power also rewets to provide a stable emulsion if desired. The binder is particularly useful for binding low value commodities such as coal, road surfaces such as dirt, sand or gravel, animal feeds and the like.

As used herein, the term "lignin" has its normal connotation, and refers to the substance which is typically recovered from alkaline black pulping liquors, such as are produced in the Kraft, soda and other well known alkaline pulping operations. The term "lignosulfonate" refers to the reaction product of lignin which is inherently obtained during sulfite pulping of wood, and is a principle constituent of spent sulfite liquor. The term "lignosulfonate containing material" refers to a lignosulfonate product which is obtained from a sulfite pulping process.

The initial solids concentration of the lignosulfonate containing starting material which is useful in making the product of the present invention is of great importance because it determines whether or not a stable emulsion is provided. High concentration favors the stability of the emulsion. The solids concentration of lignosulfonate containing material employed herein should be between about 45% to about 65%, and preferably between 50% to 65%. Emulsions prepared with solids concentrations less than about 45% are unstable for protracted storage. Also, it is not feasible to handle lignosulfonate at a solids concentration over about 65%. The term "solids" as used herein refers to the lignin as well as other impurities such as carbohydrates typically found in spent sulfite liquid so that the term "non-solids" thus refers to water only.

The hydrophobes that may be employed with the present invention are derivatives of waxes, oils, and fats, asphalt and/or mixtures of these substances. As used herein, the term "wax" refers to any group of substances with a waxy appearance made up variously of esters of fatty acids, mono-hydroxy alcohols and solid or saturated hydrocarbons. For example, paraffin wax or slack wax may be employed. With respect to "oils", this term refers to any of various kinds of greasy combustible liquid or solid substances obtained from animal, vegetable or mineral sources that are liquid at room temperature and soluable in certain organic solvents such as ether but not in water. For example, plant oils such as coconut oil, palm oil, palm kernel oil, tall oil, soybean oil, corn oil and peanut oil may be employed. Also, commercially available petroleum based fuel oils such as No. 2, No. 3, No. 5 and No. 6 fuel oils may be employed. With respect to "fats", this term refers to any of various solid or semisolid oily or greasy materials found in animal tissues and in seeds of plants composed mainly of glycerides of fatty acids that are soluble in ether or other organic solvents but insoluble in water. For example, animal tallow such as beef tallow may be employed. With respect to "asphalt", this term refers to the black bituminous residue from certain petroleums, coal tar and lignite tar consisting mainly of a mixture of hydrocarbons varying from hard and brittle to plastic in form which melts upon heating and is insoluble in water but soluble in gasoline. Finally, mixtures of the above waxes, oils, fats or asphalt may also be employed.

The amount of hydrophobe which can be used varies from about 1 part to about 50 parts per 100 parts of the lignosulfonate containing material, and preferably 1 to 30 parts. Above about 30 parts of the hydrophobe to 100 parts of the lignosulfonate containing material it becomes difficult to spray dry the emulsion.

The procedure for emulsification is very important for obtaining a stable emulsion. Emulsification must be carried out at a temperature at which the hydrophobe is a liquid. Therefore, if the hydrophobe is a liquid at room temperature (68° F. or 20° C.), no heating is necessary. If, however, the hydrophobe is a solid at room temperature, both the hydrophobe and the lignosulfonate containing material must be heated to or beyond the melting temperature of the hydrophobe to insure uniform mixing and prevent coagulation of the hydrophobe upon mixing. At this temperature, the hydrophobe is added to the concentrated lignosulfonate containing material at one part to about 50 parts of hydrophobe per 100 parts of the lignosulfonate containing material. Vigorous agitation or shearing yields a stable emulsion.

Exemplary of the efficacy of the present invention are the following examples, wherein all parts and percentages are on a weight basis, unless specified otherwise.

EXAMPLE I

This example illustrates the binding effect of lignosulfonate emulsion products made in accordance with the present invention versus lignosulfonate and No. 6 fuel oil alone. Table I shows that the emulsion products perform well as binders for coal briquettes and in fact perform better than lignosulfonate alone or No. 6 oil alone. The green strength is the compressive strength of the coal briquettes immediately after the briquetting operation and without any drying.

TABLE I

BINDING EFFECT OF EMULSION PRODUCTS VS. LIGNOSULFONATE

| Binder Product | % of binder solids on Coal Dust solids | *Green Strength, psi |
|---|---|---|
| Calcium Lignosulfonate | 6 | 37 |
| Ammonium Lignosulfonate | 5 | 19 |
| 5% Emulsion (No. 6 Oil) | 6 | 54 |
|  | 5 | 79 |

TABLE I-continued

BINDING EFFECT OF EMULSION PRODUCTS VS. LIGNOSULFONATE

| Binder Product | % of binder solids on Coal Dust solids | *Green Strength, psi |
|---|---|---|
|  | 4 | 48 |
| No. 6 Oil | 5 | 19 |
| 10% Emulsion (No. 6 Oil) | 6 | 46 |
|  | 5 | 41 |
|  | 4 | 42 |

*Tested via Dillon Tester on 1-inch diameter, 2-inch long cylinders made at 10,000 psi using a Carver Press

EXAMPLE II

This example illustrates the effects of aging and drying of coal briquettes containing 6% binder solids on the strength of the coal briquettes. The coal briquettes were prepared in an identical manner with those of Example I. Table II shows that the strength of the briquettes substantially increases as the briquettes are aged from one day to one week, and increases dramatically if the briquettes are oven dried at 105° C. prior to strength testing.

TABLE II

DATA ON COAL BRIQUETTES FROM A PLANT TRIAL AT 6% BINDER SOLIDS ON COAL

| | Strengths, psi | | |
|---|---|---|---|
| Binder Product | 1 Day | 1 Week | Oven Dried at 105° C. |
| 5% Emulsion (No. 6 Oil) | 24 | 65 | 168 |
| 10% Emulsion (No. 6 Oil) | 31 | 76 | 276 |

EXAMPLE III

This example illustrates the improved water resistance of the coal briquettes of Examples I and II. Table III illustrates that water resistance substantially increases as coal briquettes are aged without drying from one day to one week and dramatically increases when the coal briquettes are oven dried at 105° C. In fact, if dried the coal briquettes have no observable water degradation even after one week of emersion in water.

TABLE III

WATER RESISTANCE OF COAL BRIQUETTES

| | *Time to Observable Water Degradation After | | |
|---|---|---|---|
| Binder Product | 1 Day w/o Drying | 1 Week w/o Drying | Drying at 105° C. |
| 5% Emulsion (No. 6 Oil) | 1 hr. | 24 hr. | >1 Week |
| 10% Emulsion (No. 6 Oil) | 1 hr. | 24 hr. | >1 Week |

*Samples immersed in tape water at room temperature.

EXAMPLE IV

This example illustrates the water immersion effect on bond strength for coal pellets. Coal pellets were made using 30 grams of dry coal. A 62% solids emulsion (100 parts spent sulfite liquor (SSL) and 10 parts No. 6 oil) was diluted to 35% solids for application to the coal. Norlig G (a spent sulfite liquor available from Reed Lignin Inc.) was also diluted to 35% solids. Coal samples were treated with 3% of each as solids on coal. The binders were mixed with the coal, and the coal/binder mixture was pelletized using a Carver Press to 5,000 psi for 1.0 minutes. The resulting coal pellets were dried overnight at 105° C. in a force air oven and then allowed to cool to room temperature. The pellets were immersed in water and three pellets with each binder were measured with compressive strength with a Dillon Tester at 0 time, 1 hour, 2 hours and 3 hours total elapsed time. Each point is an average of 3 values. Mean strength and standard deviations are given in the following Table IV.

TABLE IV

| SAMPLE | IMMERSION MEAN STRENGTH & STANDARD DEVIATION AT | | | |
|---|---|---|---|---|
| | 0 Hr. | 1 Hr. | 2 Hr. | 3 Hr. |
| Spent Sulfite Liquor | 78 ± 2 | 69 ± 2.6 | 69 ± 1.4 | 68 ± 0.6 |
| S.S.L. Emulsion (No. 6 fuel oil) | 74 ± 3 | 71 ± 1.1 | 70 ± 1.5 | 68 ± 0.6 |
| S.S.L. emulsion (10% paraffin) | 77 ± 2.3 | 82 ± 0.6 | 78 ± 1.5 | 78 ± 0.0 |

FIG. 1 is a graph which illustrates the percentage of strength loss versus time of complete water immersion of the spent sulfite liquor utilized in Table IV versus an emulsion of No. 6 oil and spent sulfite liquor, and an emulsion of paraffin wax and spent sulfite liquor. FIG. 1 clearly shows that coal pellets employing the emulsion of the present invention have a lesser degree of strength lost over time than coal pellets utilizing lignosulfonate alone as the binder. In fact, when utilizing a 10% paraffin emulsion water immersion had no effect on the bond strength of coal for over three hours.

EXAMPLE V

This example illustrates the advantageous handling characteristics of spray dried lignosulfonate based emulsion powders made in accordance with the present invention as compared to lignosulfonate alone. Specifically, lignosulfonate based emulsion powders made in accordance with the present invention are markedly less dusty than powders made with lignosulfonate alone. In this case, emulsions of 1% and 1.9% tallow in AmeriBond (spent sulfite liquor available from Reed Lignin Inc.) and the AmeriBond alone were dried in sequence under exactly the same conditions on the same spray drier. The data in Table V shows the tallow emulsion increased the angle of repose of the powder and caused an increase in bulk density. As a result, spray dried emulsions made in accordance with the present invention provide a better handling, less dusty powder than spray dried powders from lignosulfonate alone.

TABLE V

| EFFECT OF DEDUSTING AGENT ON ANGLE OF OF REPOSE AND LOOSE BULK DENSITY | | |
|---|---|---|
| Animal Tallow | Angle | Density (lb/ft$^3$) |
| 0.0% | 32.6 | 22.12 |
| 1.0% | 40.2 | 23.83 |
| 1.9% | 43.8 | 24.49 |

An additional 50,000 lbs. of AmeriBond powder was spray dried using a 0.8% animal tallow and 0.04% soybean oil mixture as the dedusting agents. This powder was held in a silo for five days prior to shipment. It was loaded into a hopper truck without difficulty and was judged by the unloading workers and truck driver to be about 80% less dusty than standard AmeriBond. After shipment the powder was delivered to a hopper using an auger. The powder flowed from the truck as fast as the auger could carry it away, and workers observed that it was again about 80% less dusty than standard AmeriBond. A bulk density test performed by these workers found it to be about 30 lbs./ft.$^3$ versus about 25 lbs./ft.$^3$ for standard AmeriBond.

EXAMPLE VI

This example illustrates that the procedures for emulsification is very important for obtaining a stable emulsion. In this case, emulsions of 17% No. 2 oil on spent sulfite liquor solids (SSL) were prepared in a Waring Blender under identical conditions but with starting spent sulfite liquor solids at 40%, 45%, 50%, 55% and 60%. Samples were stored at 25° C. and at 60° C. for 10 days. Obvious separation of oil and spent sulfite liquor occurred in one day in the emulsion made with 40% solids spent sulfite liquor at 60° C. and at 7 days at 25° C. Within 2 days at 60° C., separation was also noticed in the emulsion prepared at 45% spent sulfite liquor solids. The emulsions prepared at 50%, 55% and 60% spent sulfite liquor solids showed no evidence of separation even after 10 days at 60° C. Furthermore, although the emulsion prepared with 30% spent sulfite liquor solids showed separation at one day and the emulsion prepared with 45% spent sulfite liquor solids showed separation within 2 days, no separation was noted for over 5 days at 60° C. when the emulsion prepared with 60% spent sulfite liquor solids was diluted to a total solids content equal to that of the emulsion prepared with starting spent sulfite liquor solids of 40%. Thus, it is the initial concentration of spent sulfite liquor solids that is critical to the formation of a stable emulsion.

While relatively high starting or initial spent sulfite liquor solids is important for obtaining a stable emulsion, the solids of final emulsions are, in each case, higher in total solids due to the hydrophobe being added and non-solids for these purposes being defined as water. Table VI compares starting spent sulfite liquor solids with emulsion total solids in the prior examples. Emulsification of less oil or more oil will lower or increase total solids.

TABLE VI

| EMULSION SOLIDS AT 17% OIL ON SOLIDS AT DIFFERENT STARTING SSL SOLIDS | |
|---|---|
| Starting SSL Solids, % | Emulsion Solids, % |
| 40 | 43.8 |
| 45 | 48.9 |
| 50 | 53.9 |
| 55 | 58.9 |
| *60 | 63.7 |

*17% oil on solids is equivalent to the 10% oil on Norlig (SSL) weight referred to in test data in the disclosure.

EXAMPLE VII

This example illustrates that wax and a mixture of oil and wax may be employed as the hydrophobe in the present invention. In this case, an emulsion was prepared with a 1 to 1 mixture of No. 6 oil and paraffin wax at 30% on spent sulfite liquor solids. A stable emulsion was achieved. Upon spray drying, a powder resulted which when rewet also provided a stable, dilute emulsion.

EXAMPLE VIII

This example illustrates that spray dried emulsions made in accordance with the present invention provide a dilute stable emulsion upon rewetting. In this case, a liquid emulsion was prepared by adding 5% of No. 6 oil in 58% spent sulfite liquor solids and shearing. A photomicrograph of the emulsion was taken. The liquid emulsion was then spray dried to form a powder and then rewet to form a second liquid emulsion. A photomicrograph of this second emulsion showed that rewet powder formed from spray drying the liquid gives an emulsion with similar particle size.

EXAMPLE IX

This example illustrates the use of tallow instead of oil. A liquid emulsion was prepared in accordance with example VIII except tallow or animal fat was utilized as the hydrophobe instead of No. 6 oil. Photomicrographs of the initial liquid emulsion and the rewet powder illustrated similar particle size for both emulsions thus indicating that a spray dried powder utilizing tallow as the hydrophobe provides a stable, dilute emulsion when rewet.

EXAMPLE X

This example illustrates that up to 50 parts of hydrophobe per 100 parts of lignin containing material may be utilized to form stable emulsions. In this case, emulsions of No. 6 oil and Norlig A (a spent sulfite liquor available from Reed Lignin Inc. having about 58.0% solids content) were prepared under identical conditions but with 5%, 10%, 20%, 30%, 40% and 50% oil by weight on Norlig A. As shown in Table VI, the emulsions were stored at 60° C. and each had a stability of at least 10 days.

TABLE VI

| Emulsion Stability | |
|---|---|
| % Oil on Norlig A Liquid Wt | Stability 60° C. |
| 5 | at least 10 days |
| 10 | at least 10 days |
| 20 | at least 10 days |
| 30 | at least 10 days |
| 40 | at least 10 days |
| 50 | at least 10 days |

Various modes of carrying out the invention are contemplated as being within the scope of the following claims particularly pointing out and distinctly claiming the subject matter which is regarded as the invention.

We claim:

1. A stable lignosulfonate based oil-in-water emulsion for use as a binder, comprising an aqueous dispersion of lignosulfonate containing material having an initial solids concentration of between about 45% to about 65% by weight, and about one part to about 50 parts, per 100 parts of the lignosulfonate containing material, of a hydrophobe.

2. The emulsion of claim 1, wherein said hydrophobe is selected from the group consisting of oils, waxes, fats, asphalt and mixtures thereof.

3. The emulsion of claim 1, wherein said lignosulfonate containing material is spent sulfite liquor from a sulfite pulping process.

4. The emulsion of claim 1, wherein said hydrophobe is soybean oil.

5. The emulsion of claim 1, wherein said hydrophobe is paraffin wax.

6. The emulsion of claim 1, wherein said hydrophobe is animal tallow.

7. The emulsion of claim 1, wherein said hydrophobe is asphalt.

8. The emulsion of claim 1, wherein said hydrophobe is a petroleum based fuel oil.

9. The emulsion of claim 1, wherein said hydrophobe comprises from about one part to about 30 parts thereof.

10. A method of producing a stable oil-in-water emulsion for use as a binder, comprising the steps of:
   forming an aqueous solution of a liqnosulfonate containing material having a solids concentration of between about 45% to about 65% by weight;
   combining said solution with from about one part to about 50 parts, per 100 parts of the solution, a hydrophobe at a temperature at which the hydrophobe is a liquid to form a mixture; and
   shearing said mixture to form a stable emulsion.

11. The method of claim 10, wherein said lignosulfonate containing material is spent sulfite liquor obtained from a sulfite pulping process.

12. The method of claim 10, wherein said hydrophobe is selected from the group consisting of oils, waxes, fats, asphalt and mixtures thereof.

13. The method of claim 10, further including the step of drying said emulsion to form a powder.

14. The method of claim 10, wherein said hydrophobe is a liquid at about 20° C., and said mixture is formed at about 20° C.

15. The method of claim 10, wherein said hydrophobe is a solid at about 20° C., and said mixture is formed by heating the hydrophobe and the lignosulfonate containing solution to a temperature at or above the melting point of said hydrophobe prior to combining the hydrophobe and lignosulfonate containing solution.

16. A binder made in accordance with the method of claim 10.

17. A binder made in accordance with the method of claim 11.

18. A binder made in accordance with the method of claim 12.

19. A stable lignosulfonate based emulsion for use as a binder, comprising an aqueous dispersion of lignosulfonate containing material having an initial solids concentration of between about 45% to about 65% by weight, and about one part to about 50 parts, per 100 parts of the lignosulfonate containing material, of a hydrophobe selected from the group consisting of oils, waxes, fats and mixtures thereof.

20. The emulsion of claim 19, wherein said lignosulfonate containing material is spent sulfite liquor from a sulfite pulping process.

21. The emulsion of claim 19, wherein said hydrophobe is soybean oil.

22. The emulsion of claim 19, wherein said hydrophobe is paraffin wax.

23. The emulsion of claim 19, wherein said hydrophobe is animal tallow.

24. The emulsion of claim 19, wherein said hydrophobe is a petroleum based fuel oil.

25. The emulsion of claim 19, wherein said hydrophobe comprises from about one to about 30 parts thereof.

26. A method of producing a stable emulsion for use as a binder, comprising the steps of:
   forming an aqueous solution of a lignosulfonate containing material having a solids concentration of between about 45% to about 65% by weight;
   combining said solution with from about one part to about 50 parts, per 100 parts of the solution, a hydrophobe at a temperature at which the hydrophobe is a liquid to form a mixture, said hydrophobe is selected from the group consisting of oils, waxes, fats and mixtures thereof; and shearing said mixture to form a stable emulsion.

27. The method of claim 26, wherein said lignosulfonate containing material is spent sulfite liquor obtained from a sulfite pulping process.

28. The method of claim 26, further including the step of drying said emulsion to form a powder.

29. The method of claim 26, wherein said hydrophobe is a liquid at about 20° C., and said mixture is formed at about 20° C.

30. The method of claim 26, wherein said hydrophobe is a solid at about 20° C., and said mixture is formed by heating the hydrophobe and the lignosulfonate containing solution to a temperature at or above the melting point of said hydrophobe prior to combining the hydrophobe and lignosulfonate containing solution.

31. A binder made in accordance with the method of claim 26.

32. A binder made in accordance with the method of claim 27.

* * * * *